(12) United States Patent
Zhang et al.

(10) Patent No.: US 11,812,009 B2
(45) Date of Patent: *Nov. 7, 2023

(54) GENERATING VIRTUAL REALITY CONTENT VIA LIGHT FIELDS

(71) Applicant: Intel Corporation, Santa Clara, CA (US)

(72) Inventors: Fan Zhang, San Mateo, CA (US); Oscar Nestares, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/232,612

(22) Filed: Dec. 26, 2018

(65) Prior Publication Data

US 2019/0132576 A1 May 2, 2019

Related U.S. Application Data

(60) Provisional application No. 62/688,631, filed on Jun. 22, 2018.

(51) Int. Cl.
*H04N 13/243* (2018.01)
*H04N 13/232* (2018.01)
*H04N 23/90* (2023.01)

(52) U.S. Cl.
CPC ......... *H04N 13/243* (2018.05); *H04N 13/232* (2018.05); *H04N 23/90* (2023.01)

(58) Field of Classification Search
CPC .. H04N 13/106; H04N 13/111; H04N 13/117; H04N 13/133; H04N 13/243; H04N 13/246
See application file for complete search history.

(56) References Cited

U.S. PATENT DOCUMENTS

| 6,327,381 | B1* | 12/2001 | Rogina | G06T 15/10 |
| | | | | 382/154 |
| 9,877,016 | B2* | 1/2018 | Esteban | G02B 27/017 |
| 10,008,027 | B1* | 6/2018 | Baker | G06T 7/50 |
| 10,244,226 | B2* | 3/2019 | Weaver | H04N 5/247 |
| 10,917,633 | B2 | 2/2021 | Zhang et al. | |
| 11,368,669 | B2 | 6/2022 | Zhang et al. | |

(Continued)

OTHER PUBLICATIONS

Peleg, Shmuel; Ben-Ezra, Moshe; Pritch, Yael; "Omnistereo: Panoramic Stereo Imaging"; IEEE Transactions on Pattern and Analysis and Machine Intelligence; vol. 23, No. 3, Mar. 2001; 12 pages.

(Continued)

*Primary Examiner* — Jeremiah C Hallenbeck-Huber
(74) *Attorney, Agent, or Firm* — HANLEY, FLIGHT & ZIMMERMAN, LLC

(57) ABSTRACT

An example system for generating light field content is described herein. The system includes a receiver to receive a plurality of images and a calibrator to intrinsically calibrate a camera. The system also includes a corrector and projector undistort the images and project the undistorted images to generate undistorted rectilinear images. An extrinsic calibrator may rectify and align the undistorted rectilinear images. Finally, the system includes a view interpolator to perform intermediate view interpolation on the rectified and aligned undistorted rectilinear images.

17 Claims, 11 Drawing Sheets

(56) References Cited

U.S. PATENT DOCUMENTS

| | | | |
|---|---|---|---|
| 2002/0122113 A1* | 9/2002 | Foote | H04N 5/2628 348/48 |
| 2003/0156077 A1* | 8/2003 | Balogh | G02B 30/27 345/6 |
| 2012/0155786 A1 | 6/2012 | Zargarpour et al. | |
| 2016/0191891 A1* | 6/2016 | Gilpin | H04N 5/77 386/224 |
| 2016/0353089 A1 | 12/2016 | Gallup et al. | |
| 2017/0230587 A1 | 8/2017 | Kanai et al. | |
| 2017/0236252 A1 | 8/2017 | Nguyen et al. | |
| 2017/0363949 A1* | 12/2017 | Valente | H04N 13/161 |
| 2018/0120573 A1 | 5/2018 | Ninan et al. | |
| 2018/0205884 A1 | 7/2018 | Hornung et al. | |
| 2018/0255288 A1 | 9/2018 | Cole et al. | |
| 2018/0270464 A1 | 9/2018 | Harviainen et al. | |
| 2018/0357804 A1 | 12/2018 | Forutanpour et al. | |
| 2019/0037200 A1 | 1/2019 | Niemela et al. | |
| 2019/0082160 A1* | 3/2019 | Yano | G06T 7/70 |
| 2019/0313039 A1* | 10/2019 | Aggarwal | G02B 27/0172 |
| 2020/0174262 A1* | 6/2020 | Godar | G06T 15/205 |

OTHER PUBLICATIONS

Anderson et al. "JUMP: Virtual Reality Video" ACM Transactions on Graphics (TOG); SA '16 Technical Papers, Dec. 5-8, 2016, , Macao ISBN: 978-1-4503-4514-9/16/12; 15 pages.

Google Jump FAQs "How Long Does the Stitching Process Take, Once the Media is Uploaded" retreived from the internet Mar. 26, 2019: https://support.google.com/jump/search?q=how%20long%20does%20the%20stitching%20process%20take.

Grigonis, Hillary "Meet the Lytor Immerge 2.0 a 95-lens VR Camera that could Soon Shoot in 10K" posted on Dec. 1, 2017 retrieved from the Internet on Mar. 26, 2019—https://www.digitaltrends.com/photography/meet-the-lytro-immerge-2/ 14 pages.

HypeVR. https://hypevr.com/ retrieved from the Internet on Mar. 26, 2019, 3 pages.

Martindale, Jon; "Virtual Reality Oculus Rift vs. HTC Vive" posted on the Internet on Dec. 14, 2018 and retrieved from th Internet on Mar. 26, 2019; ; https://www.digitaltrends.com/virtual-reality/oculus-rift-vs-htc-vive/;20 pages.

Kannala, Juho; BRANDT, Sami S. "A Generic Camera Model and Calibration Method for Conventional, Wide-Angle, and Fish-Eye Lenses" Published in: IEEE Transactions on Pattern Analysis and Machine Intelligence ( vol. 28 , Issue: 8 , Aug. 2006) 15 pages.

Scaramuzza et al.: "A Flexible Technique for Accurate Omnidirectional Camera Calibration and Structure from Motion" Published in: Fourth IEEE International Conference on Computer Vision Systems (ICVS'06) Jan. 2006, 8 pages.

Richardt et al. "Megastereo: Constructing High-Resolution Stereo Panoramas" Published in: 2013 IEEE Conference on Computer Vision and Pattern Recognition, Jun. 2013, Portland OR USA 8 pages.

Huang, et al. "Immersive Computer Graphics via Factored Near-Eye Light Field Displays with Focus Cues", The Light Field Stereoscope, published 2015, 12 pages.

Birklbauer, et al. "Panorama Light-Field Imaging", Institute of Computer Graphics, SIGGRAPH '12 ACMSIGGRAPH Talks, Los Angeles, CA, USA, 1 page, Aug. 5-9, 2012.

Shum, et al. "Rendering with Concentric Mosaics", Computer Graphic Proceedings, SIGGRAPH 99, ACM, Jul. 1, 1999, 8 pages, New York USA.

Kauff, et al. "Interactive 3-D Video Representation and Coding Technologies", Proceedings of the IEEE, vol. 93, Issue 1, Jun. 27, 2005, 13 pages.

United States Patent and Trademark Office "Non-Final Office Action" issued in connection with U.S. Appl. No. 15/705,550, dated Jun. 11, 2019, 24 pages.

United States Patent and Trademark Office "Final Office Action" issued in connection with U.S. Appl. No. 15/705,550, dated Dec. 23, 2019, 28 pages.

United States Patent and Trademark Office "Advisory Action" issued in connection with U.S. Appl. No. 15/705,550, dated Mar. 27, 2020, 3 pages.

United States Patent and Trademark Office "Non-Final Office Action" issued in connection with U.S. Appl. No. 15/705,550, dated Apr. 29, 2020, 24 pages.

United States Patent and Trademark Office "Notice of Allowance" issued in connection with U.S. Appl. No. 15/705,550, dated Sep. 21, 2020, 8 pages.

European Patent Office "Extended European Search Report", issued in connection with European Patent No. 18187153.4, dated Feb. 25, 2019, 13 pages.

United States Patent and Trademark Office "Notice of Allowance" issued in connection with U.S. Appl. No. 17/133,271, dated Feb. 25, 2022, 9 pages.

United States Patent and Trademark Office "Non-Final Office Action" issued in connection with U.S. Appl. No. 17/133,271, dated Aug. 19, 2021, 22 pages.

* cited by examiner

300

400

600

700

GENERATING VIRTUAL REALITY CONTENT VIA LIGHT FIELDS

CROSS-REFERENCE TO RELATED APPLICATIONS

This application is a non-provisional filing of provisional U.S. Patent Application No. 62/688,631, filed Jun. 22, 2018, entitled "Generating Virtual Reality Content Via Light Fields," the contents of which are hereby incorporated by reference for all purposes.

BACKGROUND

Virtual reality (VR) systems may include virtual reality capture systems and virtual reality video generating algorithms. For example, such virtual reality video generating algorithms may capture images and stitch them together to provide a full 360-degree view of the environment.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
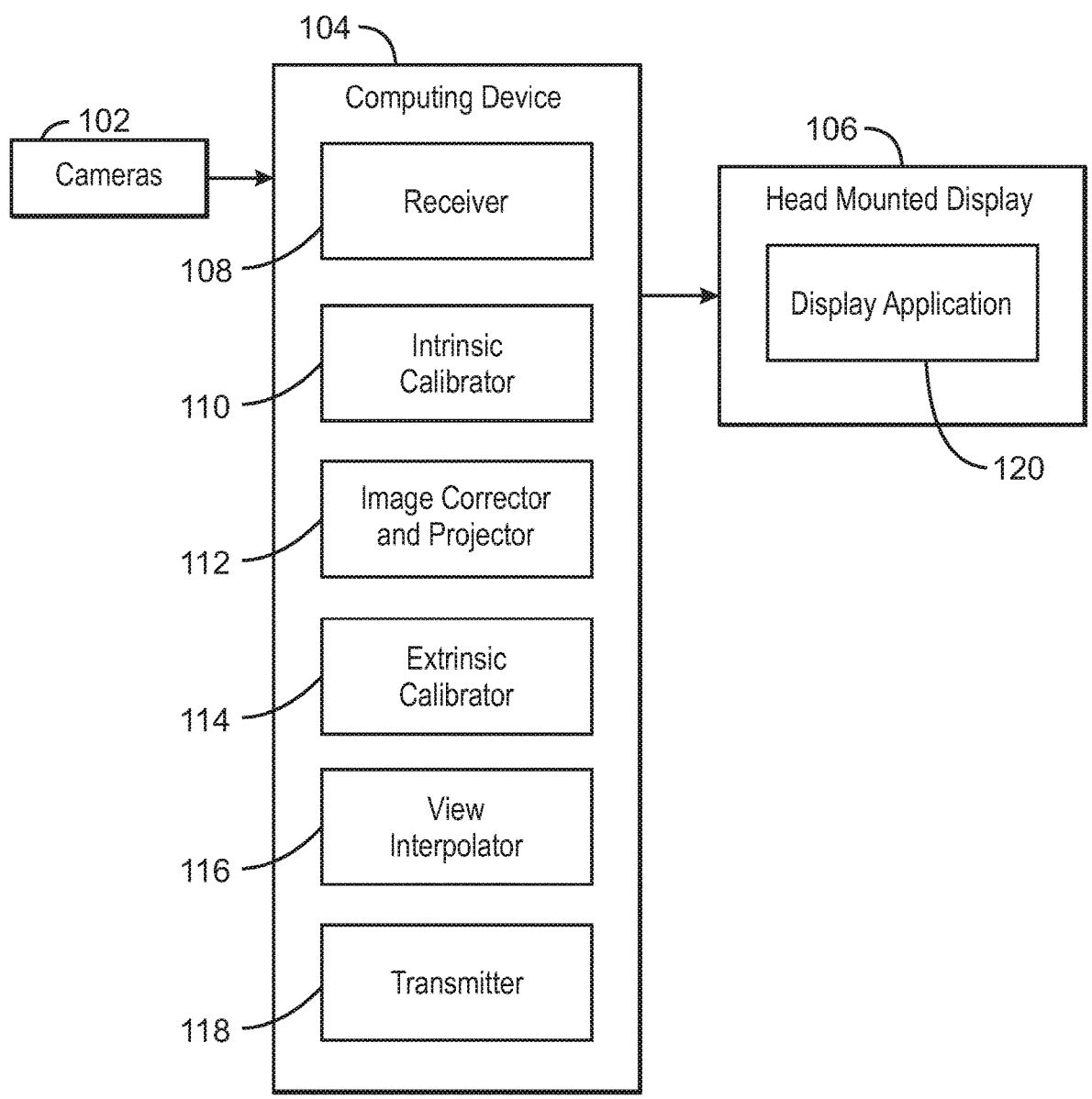
FIG. 1 is a block diagram illustrating an example system for generating virtual reality content via light fields.

Virtual reality content generation can be generally divided into two categories: stereo-based virtual reality and light field based virtual reality. Stereoscopic refers to the use of stereopsis or the perception of depth and three-dimensional structure on the basis of visual information derived from two viewpoints. The viewpoints may be binocular views. For example, the viewpoints may be two eyes of an individual with binocular vision. Stereo-based virtual reality solutions use two binocular views, while light field based virtual reality solutions use multiple views, thereby enabling parallax or more than three degrees of freedom (DOF). In a three-dimensional scene, there are six-degrees of freedom. Three-degrees of freedom include rotational movement such as pitch, roll, and yaw. The remaining three-degrees of freedom include translational movements along an x, y and z axis. To deliver comfortable viewing experiences, both solutions require tremendous post-processing time to either create 360-degree field of view (FOV) using advanced stitching algorithms or to create three dimensional (3D) models of the captured scene using structure from motion techniques.

The present disclosure relates generally to techniques for generating virtual reality content via light fields. The present techniques capture and render 360-degree FOV light field content without any 360-degree panorama stitching algorithm or structure from motion technique. The 360-degree light field rendering problem is converted into a real time position tracking-based view interpolation problem, which largely reduces the complexity of the light field virtual reality system without compromising the quality of the content. The techniques described herein include an apparatus, method and system for generating virtual reality content via light fields. A plurality of images may be received from a plurality of wide-angle cameras. The images are corrected, and in some cases the images are aligned. Intermediate views may be interpolated from the corrected plurality of images. The resulting images and views may be transmitted for rendering based on a requested perspective. For example, a virtual reality application or system may request particular images or views in response to movement by a viewer.

Traditional virtual reality solutions typically use advanced stitching techniques, such as an omni-directional stitching algorithm, to create 360-degree stereoscopic panoramas which contain two slightly different left and right images. The difference between these two images enables human vision systems to infer depth of the environment in order to deliver an immersive viewing experience. Stitching algorithms take days to process the captured video data. Additionally, the lack of motion parallax cues in scene rendered by these stitching algorithms not only largely reduces the immersive feeling of the virtual experience, but also introduces visual fatigue to the viewer. Advanced light field virtual reality solutions render light field content by creating a 3D model of the captured scene so that viewers can freely move their heads to see different perspectives of the virtual world. A light field-based solution can deliver a better immersive viewing experience than traditional virtual reality solutions. However, while a light field-based solution can enhance the realism, the dense scanning method associated with typical light field-based solutions limits the output of these solutions to light field images instead of videos. Further, light field virtual reality solutions often require expensive capture systems, tremendous manual work, and extremely time-consuming structure from motion techniques to build the 3D dense model of the captured scene. Similarly, generating volumetric videos to support motion parallax might rely on light detection and ranging (LiDAR) systems and tremendous manual work, which is cost-inefficient and cannot recover accurate depth information for dynamic scenes with significantly moving objects.

The techniques described herein enable motion parallax to be included in virtual reality videos and images. By using circular array of cameras rather than two viewpoints within the same viewing circle, the motion parallax effect can be introduced into generated light field panoramas representing different perspectives. As translation of the head mounted display is detected, different perspectives may be displayed according to the translation. In particular, the introduced motion parallax effect improves the depth perception of viewers viewing the virtual reality using head mounted displays. The techniques described herein enable viewers to feel motion parallax as the viewer's head rotates and translates, providing a more immersive viewing experience.

Moreover, the present techniques also enable an application for a device for displaying the generated light field views.

The techniques described herein further enable a time-saving feasible strategy that reduces the conventional 360-degree FOV light field panorama rendering solution to a head position tracking-based view interpolation solution. In particular, the present techniques do not transmit 360-degree panoramas or panoramic images to head-mounted displays (HMD). The limited field of view of the HMD results in no need to send a full 360-degree of panoramic image for each view. Instead, the present techniques deliberately use cameras with a wide field of view, such as a 220-degree FOV fisheye lens, to capture content of the scene. The content may be light-field content. The wide field of view can fully cover a corresponding head mounted display field of view. Put another way, the head mounted display has a field of view that can render no more than the FOV associated with a camera with a wide field of view. In this scenario, the light field rendering problem can be formulated as a view interpolation problem. The present techniques render the specific stereoscopic perspective by first tracking the viewer's head position and then interpolating such a virtual view using the fetched corresponding captured views.

The present techniques render real immersive light field virtual reality content which enables both stereopsis and motion parallax. The light field virtual reality content is rendered efficiently, such that with GPU support the system can easily deliver a real-time light field virtual reality rendering. In embodiments, any parallel processing unit can be used to render the light field virtual reality content described herein in real time. Finally, the present techniques are automatic end-to-end and cost-effective, with no tedious manual work or advanced capture devices such as LiDAR being needed.

FIG. 1 is a block diagram illustrating an example system for generating virtual reality content via light fields. The example system is referred to generally by the reference number 100 and can be implemented in the computing device 1000 below in FIG. 10 using the method 900 of FIG. 9 below.

The example system 100 includes a plurality of cameras 102, a computing device 104, and a head mounted display 106. The computing device 104 includes a receiver 108, an intrinsic calibrator 110, an image corrector and projector 112, an extrinsic calibrator 114, a view interpolator 116, and a transmitter 118. The head mounted display 106 includes a display application 120.

As shown in FIG. 1, a plurality of cameras 102 may capture images or video to be converted into light field virtual reality content. For example, the cameras 102 may be arranged into at least one camera ring. As used herein, a camera ring is a plurality of cameras arranged such that a full 360 degrees of an environment or scene can be captured by the plurality of cameras. The cameras may also be arranged into multiple camera ring layers with a different radius for each layer. Each camera may be a wide-angle camera that includes a wide-angle lens. As used herein, a wide-angle lens refers to a camera lens that is at least wider than a human visual field. For example, the cameras 102 may be eighteen cameras with wide-angle lenses having an ultra-wide field of view of at least 220 degrees. In this example, a single camera can capture content that completely covers a viewer's field of view. Thus, the size of the image or the intermediate view is sufficiently large to render entirely in a human visual field, with no other visual information rendered in the human visual field. The resulting wide image and interpolated intermediate views can be used to eliminate all panorama stitching or processing that is done in traditional virtual reality solutions. For example, image capture with a field of view of at least 220 degrees can be used to collect more light rays than normal lenses, which assists in light field reconstruction and enables more parallax. Accordingly, a larger number of cameras may also be used to provide more parallax.

The computing device 104 may receive images from the cameras 102 and output light field virtual reality content corresponding to particular perspectives to the head mounted display 106. In some examples, the images may be temporally synchronized using audio. The receiver 108 may receive the plurality of images and transmit the plurality of images to the intrinsic calibrator 110. The intrinsic calibrator 110 may calculate parameters to be applied to the fisheye camera. Intrinsic parameters may include the parameters intrinsic to the camera itself, such as the focal length and lens distortion. In some examples, a checkerboard may be used to perform intrinsic calibration. A generic projection model may be used to approximate the fisheye projection, and then an affine transformation is applied to approximate the tangential distortion introduced by the fisheye camera.

An image corrector and projector 112 can obtain calibrated camera intrinsic parameters from the intrinsic calibrator 110 and apply fisheye correction and spherical projection to all fisheye images. The correction will undistort the fisheye image, and the re-projection will project the image content from a fisheye image plane to an equirectangular image plane. An extrinsic calibrator 114 may be used to estimate camera extrinsic parameters. Extrinsic parameters are parameters used to describe the transformation between the camera and its external world. To determine the extrinsic parameters, a number of reference cameras may be selected, and a stereo calibration may be performed between each camera pair. A stereo calibration may then be performed between the reference cameras to complete a full camera circle extrinsic calibration. The images may also be rectified and aligned so that pixels between each image pair are aligned along the same horizontal line. Rectification may be used to transform images by projecting two-or-more images onto a common image plane or spherical surface. For example, instead of maintaining perfect camera alignment, rectification of images may be used to align the images taken by cameras that may be misaligned. The resulting images have no vertical disparities nor any fisheye distortion. In this manner, a smooth view transition between each neighboring view is enabled.

A view interpolator 116 is used to interpolate dense views in between two neighboring views to support a smooth circular head movement, including any associated translation or rotation. The view interpolator 116 may use a disparity between neighboring views of the undistorted rectilinear or spherical images to determine an optical flow between the undistorted rectilinear images. The optical flow can then be used to perform intermediate view interpolation on the undistorted rectilinear images. For example, intermediate view interpolation may be performed between undistorted rectilinear or spherical images corresponding to neighboring cameras. In some examples, the interpolation may also be based on a smoothness factor that varies with a speed of the detected movement of a head mounted display, as described below. The view interpolator derives a plurality of views that fully covers a viewer's field of view in the HMD 106.

The result of interpolation may be thousands of interpolated views with an FOV of 220 degrees, for example. In some examples, other FOV values may be used depending on the number of cameras used. Accordingly, the transmitter 118 may then transmit particular views corresponding to a viewer's perspective or a particular head position of the viewer as requested from the display application 120 of the head mounted display 106.

The display application 120 may thus be configured to detect translation, rotation, or any combination thereof, of the head mounted display (HMD). For example, the display application 120 can detect a translation of the HMD and send a request for an updated perspective based on the new coordinates of the HMD resulting from the translation. The display application 120 may be configured to receive the generated views from the transmitter 118 and display the views in the head mounted display 106. For example, the received view may be from the perspective corresponding to the latest coordinates of the HMD. However, a fully stitched panorama is not sent, as each view, enabled by the design of the capture system with fish-eye lenses, fully covers the field of view of the viewer. Put another way, the size of the image or the intermediate view to be rendered in a virtual reality application is sufficiently large or large enough to render entirely in the field of view of a display. This rendering leaves no gaps or portion of the display without image data from the image or the intermediate view.

Additionally, motion parallax is introduced into each view as a result of the physical separation between the neighboring cameras used in the interpolation. During view interpolation, the depth maps between two neighboring views are estimated, and the depth information is used to preserve all motion parallax. In embodiments, sliced depth is used to interpolate new views so that the original motion parallax is maintained in the virtual view. As a result, a translation or rotation of a viewer's head may result in a different perspective with noticeable motion parallax. For example, objects in the background may move with less speed than objects in the foreground, enabling different views to uncover previously occluded regions in the scene.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, computing devices, components, head mounted displays, etc.).

The present techniques can generate realistic real-world virtual reality content including stereopsis and motion parallax, and can render the content in real time. Traditional solutions either create virtual content that lacks of realism or require tremendous processing time and manual work. The present techniques render realistic light field virtual reality content efficiently in a cost-effective manner.

Figure 2:
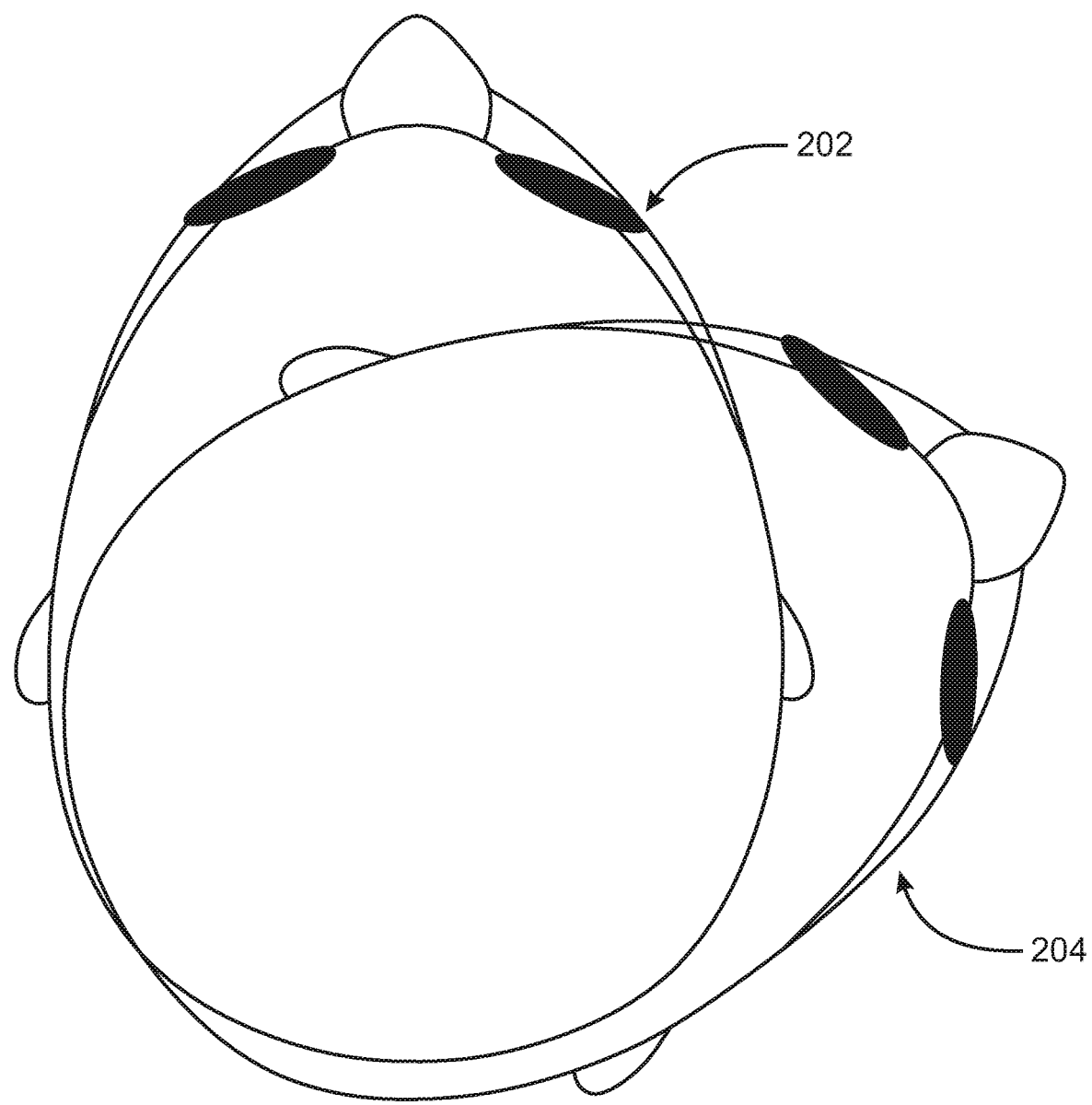
FIG. 2 is a diagram of a viewer.

FIG. 2 is a diagram of a viewer 200. At reference number 202, the viewer may be facing a first direction, while at reference number 204, the viewer has rotated to observe different views of the surrounding environment. In this typical use case, even pure head rotation still introduces both eye rotation and eye translation in space. Therefore, to deliver a realistic virtual experience, the rendered virtual reality content should enable both stereopsis that provides one distinct view for each eye to enable 3D vision, and motion parallax that provides the appropriate perspective for each eye position as the eye translates in space. Stereopsis is the perception of depth produced by the viewer observing visual stimuli from both eyes in combination. Parallax is a displacement or difference in the apparent position of an object viewed along two different lines of sight, and is measured by the angle or semi-angle of inclination between those two lines. Due to foreshortening, nearby objects may show a larger parallax than farther objects when observed from different positions, so parallax can be used to determine distances. Motion parallax, as used herein, thus refers to the movement of objects in the distance appearing to be slower than the objects close to a camera or viewer.

Virtual reality capture systems are usually different variations of circular camera arrays to capture the surrounding environment in 360 degrees. Traditional virtual reality solutions typically use omni-directional stitching techniques to create a 360 degrees stereoscopic panorama and display it to the viewer. Such content assumes that there is only rotation in the eye movement. As a result, a different portion of the full panorama is displayed when the viewer rotates the head, but no motion parallax can be perceived in the virtual experience. Advanced virtual reality solutions use 3D reconstruction techniques to create the whole 3D model of the captured scene, which enables both stereopsis and motion parallax. However, 3D reconstruction requires dense capture and is extremely time-consuming, and does not degrade gracefully in case of incorrect reconstruction.

To efficiently render light field virtual reality content that can provide both stereopsis and motion parallax according to the present techniques, it is unnecessary to stitch a 360-degree panorama or create the whole 3D model of the surrounding environment for rendering in an HMD. Most HMDs do not support the rendering or display of an entire 360-degree field of view at a single time instance. Instead, most HMDs support around a 110-degree diagonal FOV for each eye, which means the visual data that is rendered is limited. For example, a typical HMD renders limited visual data, such as approximately an 80-degree FOV in a horizontal direction and 90-degree FOV in a vertical direction, at each time instance. As a result, instead of pre-generating all content that covers a 360×180 degree field of view, the present techniques render the view corresponding to the viewer's head position that fully covers the viewer's field of view. Alternatively, the view to be generated is a field of view that covers the display capability of the HMD.

As the viewer rotates their head as illustrated in FIG. 2, the viewer's head position is used to fetch the corresponding binocular views captured from different cameras and display them to the viewer. The corresponding binocular views, as the viewer keeps rotating the head, will include the motion parallax that is captured by the fact that the cameras are translated (which is distinguished from rotated) from each other. According to the present techniques, a light field generation system has three main properties to enable light field content generation in real time with stereopsis and motion parallax. First, each camera of the system provides a wide enough field of view so that the captured images can directly cover at least the viewer's entire field of view without stitching multiple images. Second, when a viewer rotates or translates their head, views are delivered to the HMD with a smooth transition and without introducing any incoherent viewing experience. Finally, the views are rendered in real-time.

In embodiments, the present techniques may render images for an HMD operates in stereo, with two distinct images presented on the two displays, or in mono, where the same image is presented to both eyes. Stereopsis may be enabled herein by using a binocular distance as a guideline to calculate the offset between views. In an HMD with separate views for each eye, a binocular distance may be used as a guideline to determine an offset between views presented to each eye. For example, the binocular distance may correspond to an average baseline distance between human eyes.

Figure 3:
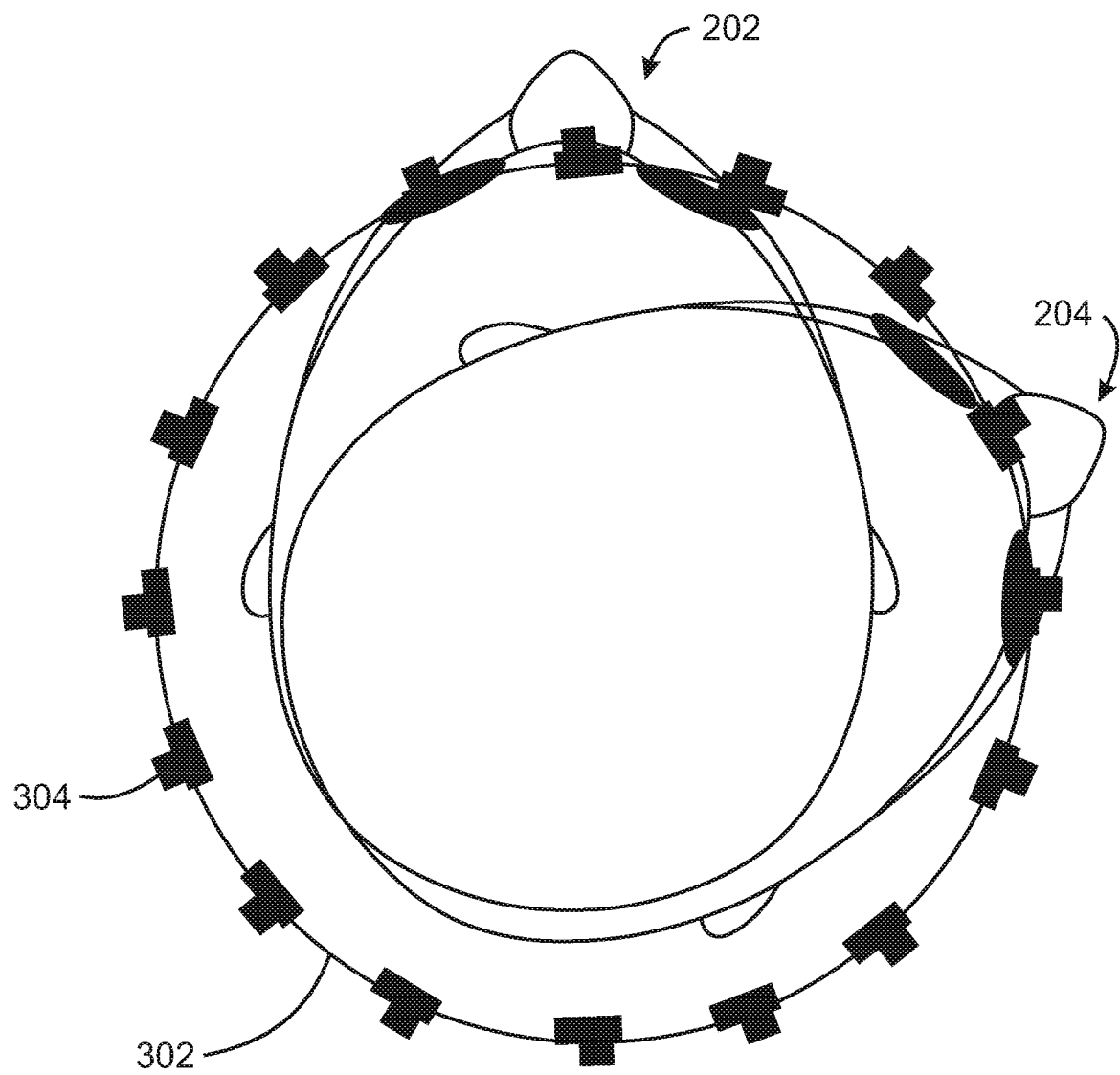
FIG. 3 is an illustration of fisheye camera array design.

FIG. 3 is an illustration of fisheye camera array design 300. As illustrated, the circular camera array 302 contains a plurality of spherical cameras, each having a wide or ultra-wide lens, such as camera 304. In embodiments, the cameras may be eighteen cameras with ultra-wide 220-degree FOV fisheye lenses. A camera array is a plurality of cameras with wide or ultra-wide lenses that is able to fulfill the three properties of a light field generation system as stated above. A spherical camera with a 220-degree FOV lens can capture more light rays than a pinhole camera model with regular lenses. As a result, a single captured image from the camera array can completely cover a viewer's field of view efficiently, which eliminates all panorama stitching and processing associated with traditional virtual reality solutions.

Figure 4:
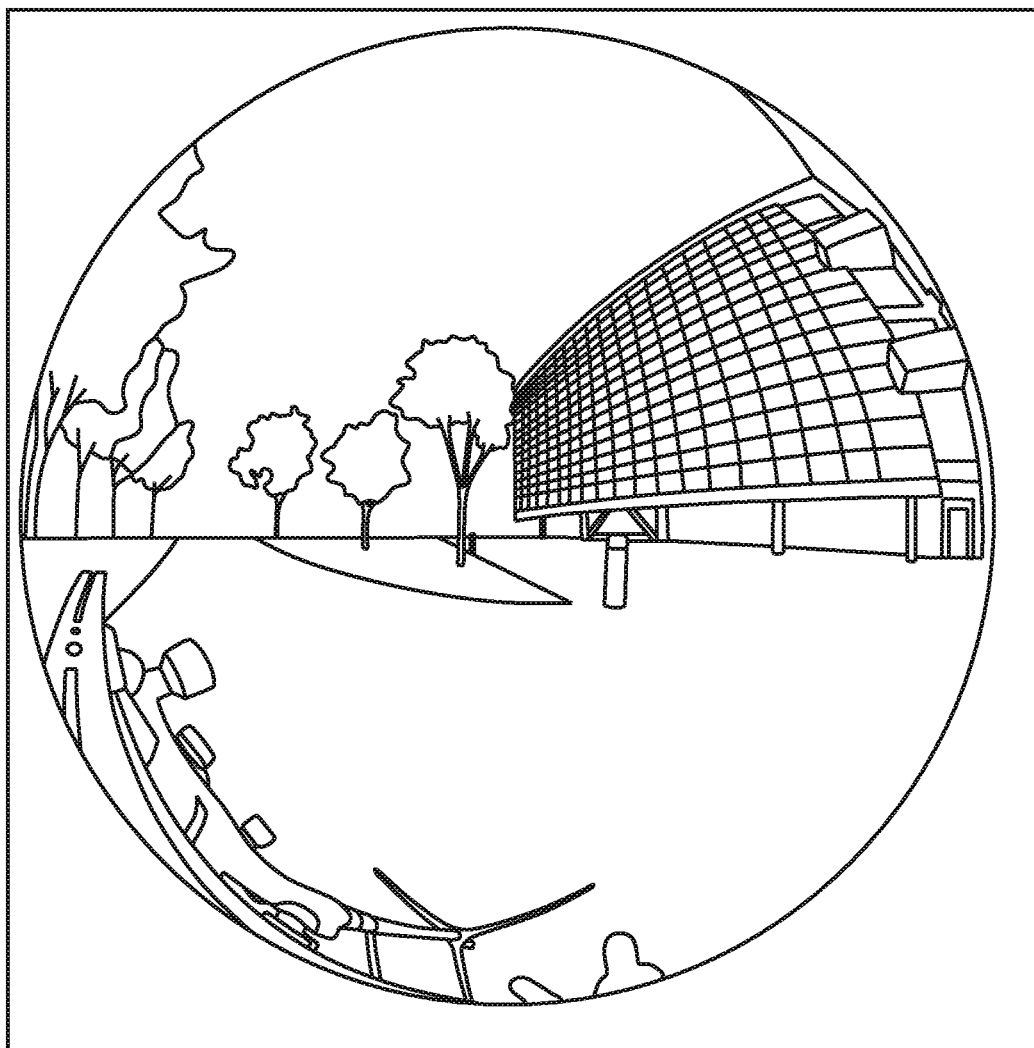
FIG. 4 is an illustration of a wide FOV fisheye image.

FIG. 4 is an illustration of a wide FOV fisheye image 400. Objects in a fisheye camera are subject to a severe distortion. For example, the larger the distance to the camera's center, the more distorted objects appear in the image. Thus, the fisheye effect results in a distorted image, where the distortion is dependent on a distance from the camera center. Objects closer to the camera center appear normal, while objects farther from the camera center are distorted with a convex non-rectilinear appearance.

To properly use the captured fisheye image data, the fisheye cameras are calibrated to provide some compensation for the severe fisheye distortion in the images. For fisheye calibration, a generic projection model may be used to approximate the fisheye projection. In examples, the projection model may be a Taylor projection model to approximate the fisheye projection as described by Eq. 1:

$$r(p) = a_0 + a_2\rho^2 + a_3\rho^3 + a_4\rho^4 \qquad \text{Eq. 1}$$

where $\rho$ is the metric distance between the image center and a particular measured pixel and $a_0, a_1, a_2, \ldots, a_n$ are polynomial distortion coefficients. In embodiments, after calibration of the camera these polynomial coefficients, a portion of the intrinsic parameters are estimated. For each camera, the intrinsic parameters vary based on the specific configuration of the camera. In embodiments, the intrinsic parameters are based on the type of camera, distortions inherent in the lenses of the camera, and other camera specific values.

Since a camera lens may not be parallel with the image plane, certain tangential distortion can be introduced to the images. An affine transformation is used to approximate the tangential distortion as follows:

$$\begin{bmatrix} u' \\ v' \end{bmatrix} = \begin{bmatrix} c & d \\ e & 1 \end{bmatrix} \begin{bmatrix} u \\ v \end{bmatrix} + \begin{bmatrix} c_x \\ c_y \end{bmatrix} \qquad \text{Eq. 2}$$

where c, d, e are tangential distortion coefficients which take into account the camera resolution in each direction, $c_x$ and $c_y$ are the principle point in x and y coordinates, u' and v' are pixel coordinates, u and v are image coordinates. The set of intrinsic parameters are in this case the previous polynomial coefficients, plus the tangential distortion coefficients and the principal point. A chessboard calibration pipeline may be used to estimate the intrinsic parameters of the fisheye cameras.

The raw fisheye images have severe fisheye distortion as shown in FIG. 4. To process the raw fisheye image and render the captured content to viewers, the calibrated camera intrinsic parameters are used to do a fisheye correction and a spherical projection on all fisheye images. The intrinsic parameters may include polynomial coefficients, camera centers, camera resolution, or any combination thereof. During projection, the image content is projected from a fisheye image plane to an equirectangular image plane.

Figure 5:
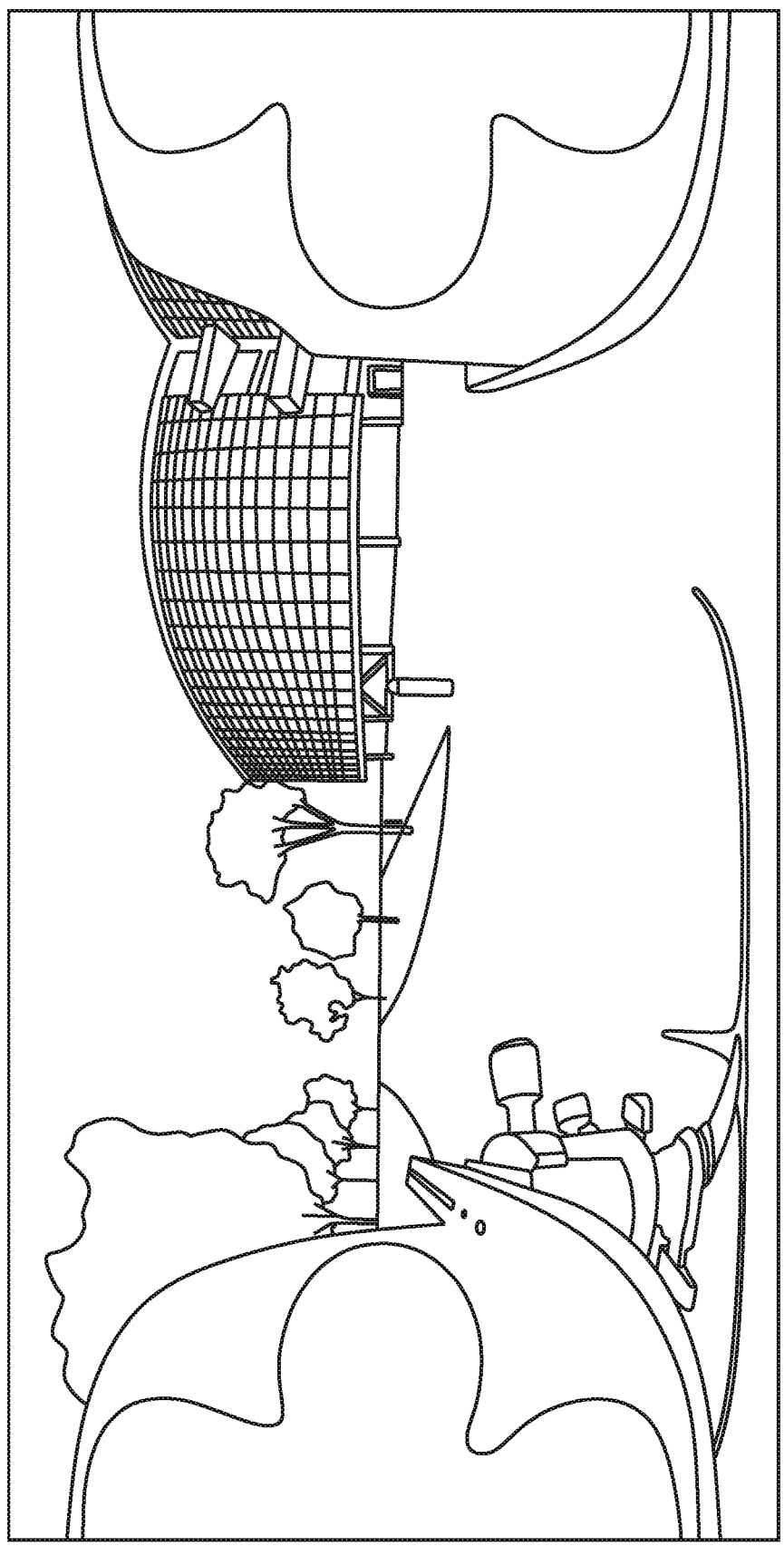
FIG. 5 is an illustration of the undistorted equirectangular image derived from the fisheye image of FIG. 4.

FIG. 5 is an illustration of a corrected and re-projected ultra-wide FOV fisheye image 500. Given a 3D world point P (X, Y, Z), its corresponding 3D vector (x, y, z) on a unit sphere can be computed using its angular spherical coordinates ($\theta$, $\varphi$) as follows:

$$\begin{cases} x = \cos\varphi * \sin\theta \\ y = \cos\varphi * \cos\theta \\ z = \sin\varphi \end{cases} \qquad \text{Eq. 3}$$

Then this 3D vector will be projected onto a fisheye image plane using equations (1) and (2). Specifically, in order to undistort the fisheye image and improve the viewing experience, a spherical projection may be used to project the image content from the fisheye image plane to an equirectangular image plane. For any point in the fisheye image plane, equations (1), (2) and (3) are used to derive the corresponding angular spherical coordinates in the unit sphere. Those spherical coordinates are then used to re-project the point on the unit sphere to an equirectangular image plane, the corresponding re-projected coordinate (i,j) can be computed as follows:

$$\begin{cases} i = \left(\frac{\varphi}{\pi} + 0.5\right) * h \\ j = \left(\frac{\theta}{2\pi} + 0.5\right) * w \end{cases} \qquad \text{Eq. 4}$$

where w and h are the width and height of the equirectangular image. Thus, FIG. 5 is an illustration of the undistorted equirectangular image derived from the fisheye image of FIG. 4.

To estimate camera extrinsic parameters (such as 3D rotation and 3D translation of one camera with respect to a reference coordinate frame, typically attached to a reference camera), the circular camera array may be divided into two half circles for processing. The camera array is divided to calculate the extrinsic parameters due to the wide FOV captured by each camera. Using a single reference camera to calculate extrinsic parameters for a large number of cameras with a wide FOV, such as a 220-degree FOV, may not provide enough overlap between cameras and can thus lack enough overlapping data points between cameras to accurately calculate the extrinsic parameters. Thus, one or more reference cameras may be used to calculate the extrinsic parameters of the camera array. In embodiments, a reference camera is selected from each half of the camera array and the extrinsic parameters are estimated. Stereo calibration is then performed on each camera pair in each half of the camera array, and a final calibration is done on the pair of reference cameras.

Figure 6:
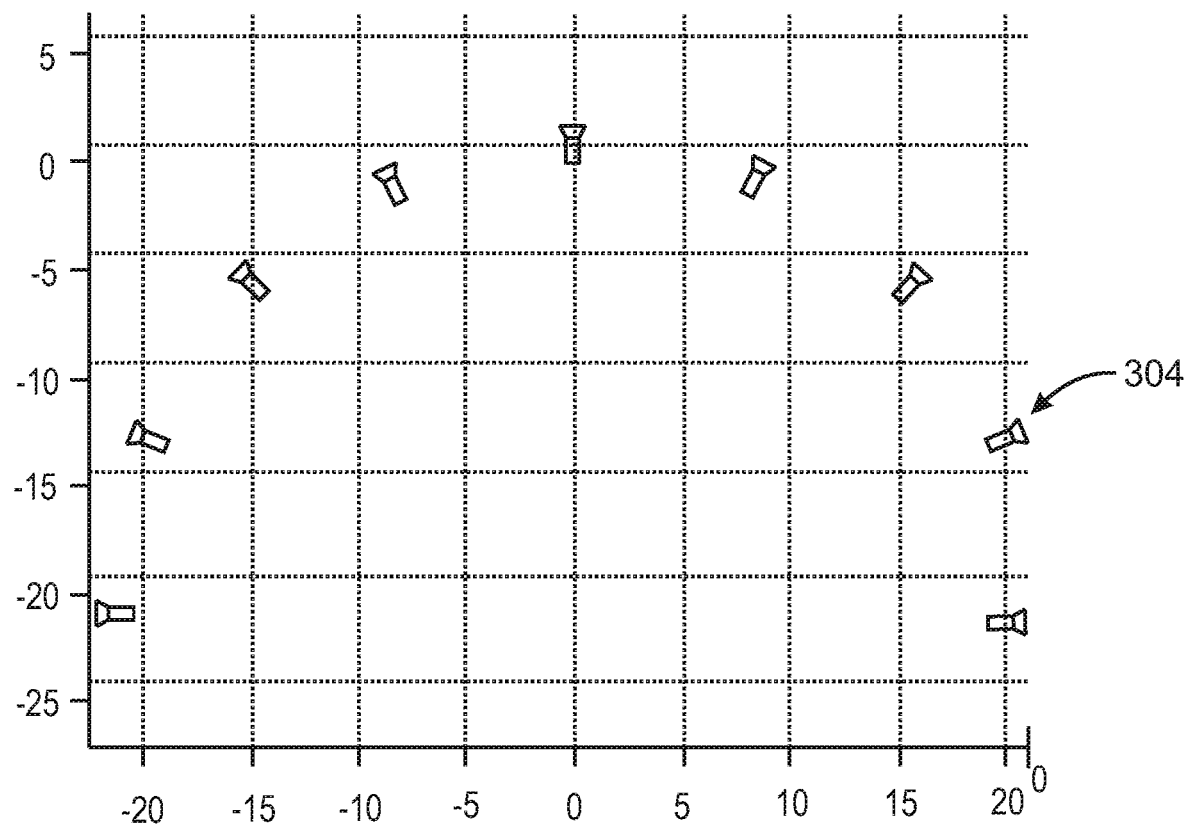
FIG. 6 is a top view of half of a camera array.
Figure 7:
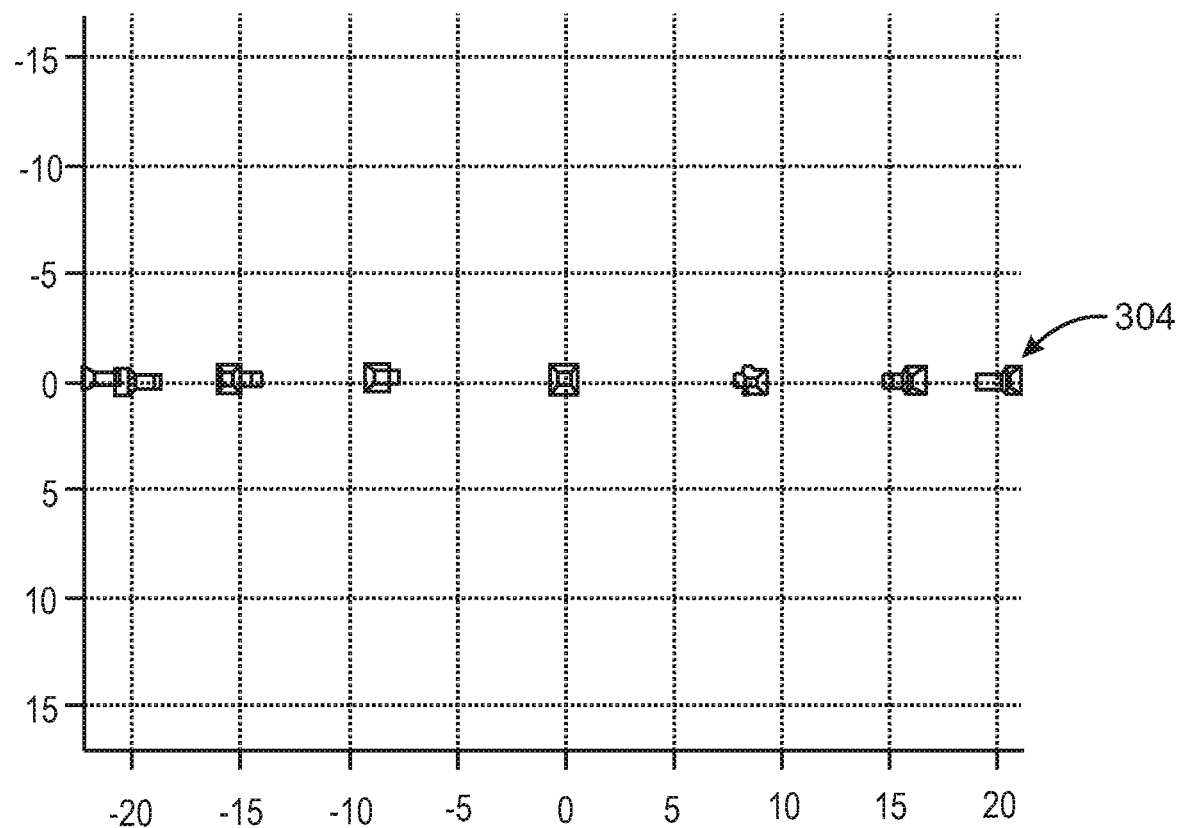
FIG. 7 is an illustration of a side view of half of the camera array.

FIG. 6 is a top view of half of a camera array 600, while FIG. 7 is an illustration of a side view of half of a camera array 700. Recall that in an example of the present techniques, eighteen cameras are used in the circular camera array. In this example, camera 4 and camera 13 may be selected as references camera in the two half circles, where cameras 1-9 form a first half circle and cameras 10-18 form a second half circle. The cameras may be numbered sequentially, from with cameras that are numbered consecutively being neighboring cameras. Stereo calibration is then performed between each consecutively numbered camera pair. FIG. 6 and FIG. 7 show the top view and side view of the cameras positioned according to the estimated rotations and translations (extrinsic calibration results) for half of the circle. Stereo calibration is then performed between the two reference cameras to finish the full camera circle extrinsic calibration.

To further correct the imperfect alignment of the cameras, a general camera pose correction algorithm may be applied to images from each camera to rotate each camera so that the Y axis of each camera is perpendicular to the camera optical center plane, and the Z axis of each camera is perpendicular to the camera circle. In embodiments, the camera poses may be estimated using a general structure-from-motion with global bundle adjustment. In structure from motion calculations, three-dimensional structures are estimated from two-dimensional image sequences coupled with local motion signals. In the structure-from-motion calculations, the correspondence between images and the reconstruction of structures in the environment are determined. In bundle adjustment, three-dimensional point positions and camera parameters are calculated that minimize a re-projection error. Thus, bundle adjustment includes a joint non-linear refinement of camera and point parameters. After estimation of the camera pose, all images are globally rectified to align them horizontally so that corresponding pixels between each image pair are aligned along the same horizontal line.

After the images have been aligned and rectified, view interpolation and six degree of freedom light field content rendering may be performed. The circular camera array may be sparsely configured, such that images from the circular camera array cannot support a dense head motion. For example, each of the eighteen images captured from a circular camera array containing eighteen cameras may include a large amount of parallax between each neighboring image pair that prevents a smooth view transition. A view interpolation algorithm is used to interpolate dense views in between two neighboring views to support a smooth circular head movement. In this manner, a sparse circular camera array can be used to derive hundreds of thousands views as if they were captured from a very densely arranged camera array. In embodiments, any off-the-shelf view interpolation algorithm can be used. For example, view interpolation may be performed by estimating bi-directional optical flow between neighboring camera images and warping the result, taking into account occluded/dis-occluded regions, or with more complex blending procedures.

Figure 8:
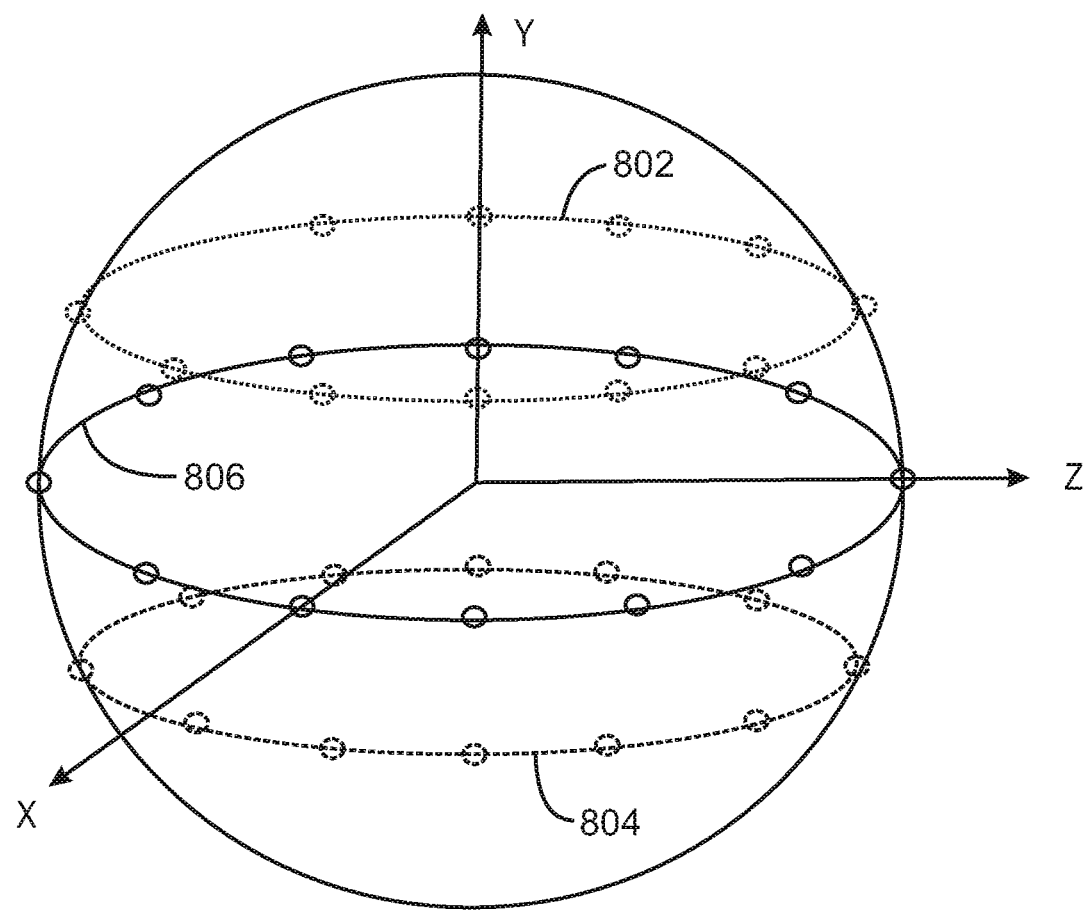
FIG. 8 is an illustration of a plurality of camera rings.

The camera array described above includes one circular layer of cameras. From a single circular array of cameras, a four degree of freedom (DoF) view may be achieved. Specifically, the single ring of cameras can be used to enable pitch, roll, and yaw, with a single translational movement. To support a six DoF light field content generation, multiple camera ring layers with different radius as shown in FIG. 8 may be used. FIG. 8 is an illustration of a plurality of camera rings 800. The camera rings are arranged along a virtual sphere that is used to described the positioned of the camera rings relative to other camera rings. As illustrated, three cameras rings 802, 804, and 806 are illustrated. The camera ring 802 and the camera ring 804 have the same radius. With two camera rings of the same radius, view interpolation may be performed in the Y direction, as the second ring will provide the required translation in the Y direction for performing this view interpolation. As illustrated, camera ring 806 has a larger radius than each of camera rings 802 and 804, and is located halfway between camera rings 802 and 804. With the addition of camera ring 806, view interpolation may be enabled in the Z direction, as there is effectively camera translation in the Y direction and the Z direction between the camera rings 802/804 and the camera ring 806. Virtual views can be rendered based on the to the corresponding cameras (which are the nearest neighbors to the desired virtual view) to deliver a six degree of freedom light field content.

The present techniques effectively eliminate the image stitching and 3D reconstruction processing from the traditional light field virtual reality content generation pipeline, introduces motion parallax into the final result. A display application may fetch the corresponding virtual view according to the viewer's head position. In this manner, viewers can see different stereoscopic perspectives instead of a fixed stereo content as typically rendered by traditional virtual reality applications.

Figure 9:
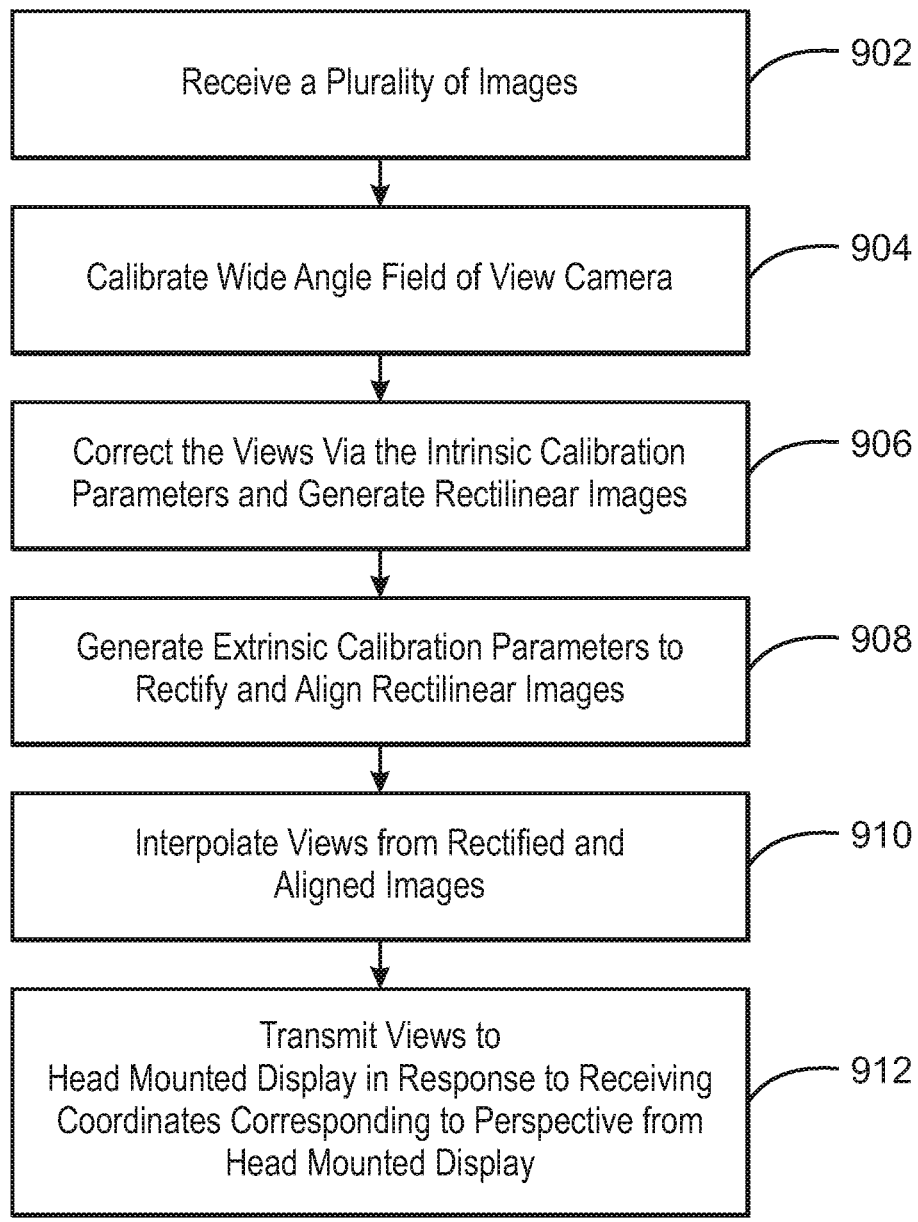
FIG. 9 is a process flow diagram illustrating a method for generating virtual reality content via light fields.

FIG. 9 is a process flow diagram illustrating a method 900 for generating virtual reality content via light fields. The example method is generally referred to by the reference number 900 and can be implemented using the computing device 104 of FIG. 1 above, the processor 1002 of the computing device 1000 of FIG. 10 below, or the computer readable media 1100 of FIG. 11 below.

At block 902, a processor receives a plurality of images. For example, the images may have been captured using a ring of cameras. In some examples, the cameras may have a field of view of 220 degrees or greater. In some examples, the images may be synchronized using audio. For example, the audio may be ambient noise or captured sound from an environment. In some examples, the audio can be matched from different cameras and video frames at the same point in time and used to generate a view. In some examples, the processor may cause a camera to capture the synchronized images.

At block 904, the processor calibrates a camera from a plurality of wide-angle field of view cameras in a camera ring. In embodiments, the cameras may be arranged in a single layer ring of cameras. In another embodiment, the cameras may be arranged in multiple rings with different diameters in a stacked configuration. Each camera is calibrated by calculating a number of intrinsic parameters. At block 906, an image from the camera is corrected via the intrinsic calibration parameters. In embodiments, multiple images are corrected via their respective intrinsic calibration parameters found at block 904. Correcting the image may also include undistorting the images. The undistorted image may be projected onto a unit sphere. The projection onto the sphere may then be used to re-project the image from the unit sphere to an equirectangular image plane.

At block 908, extrinsic calibration parameters are generated to rectify and align the rectilinear images. To estimate camera extrinsic parameters, the circular camera array may be divided into two half circles for processing. The undistorted images are rectified to compensate for camera misalignment.

At block 910, views are interpolated from the rectified and aligned images. In some cases, view interpolation includes estimating the disparity between neighboring views of the undistorted rectilinear images to determine an optical flow between the undistorted rectilinear images. For example, the processor can perform intermediate view interpolation on undistorted rectilinear images from neighboring cameras. In some examples, the interpolation may also be based on a smoothness factor. For example, the smoothness factor may be derived from the speed of translation of a head mounted display. In some examples, the smoothness factor may be higher with lower speed detected from the head mounted display. In some examples, the smoothness factor may be lower with higher speed detected from the head mounted display.

At block 912, the interpolated views may be transmitted to a head mounted display in response to receiving coordinates corresponding to a perspective from the head mounted display. In some examples, the processor can then receive updated coordinates corresponding to a detected translation from a head mounted display and transmit a stereoscopic light field view to the head mounted display corresponding to the updated perspective. The stereoscopic light field view displayed on the head mounted display may enable a viewer to detect motion parallax corresponding to the translation of the head mounted display.

This process flow diagram is not intended to indicate that the blocks of the example process 900 are to be executed in any particular order, or that all of the blocks are to be included in every case. Further, any number of additional blocks not shown may be included within the example process 900, depending on the details of the specific implementation.

Figure 10:
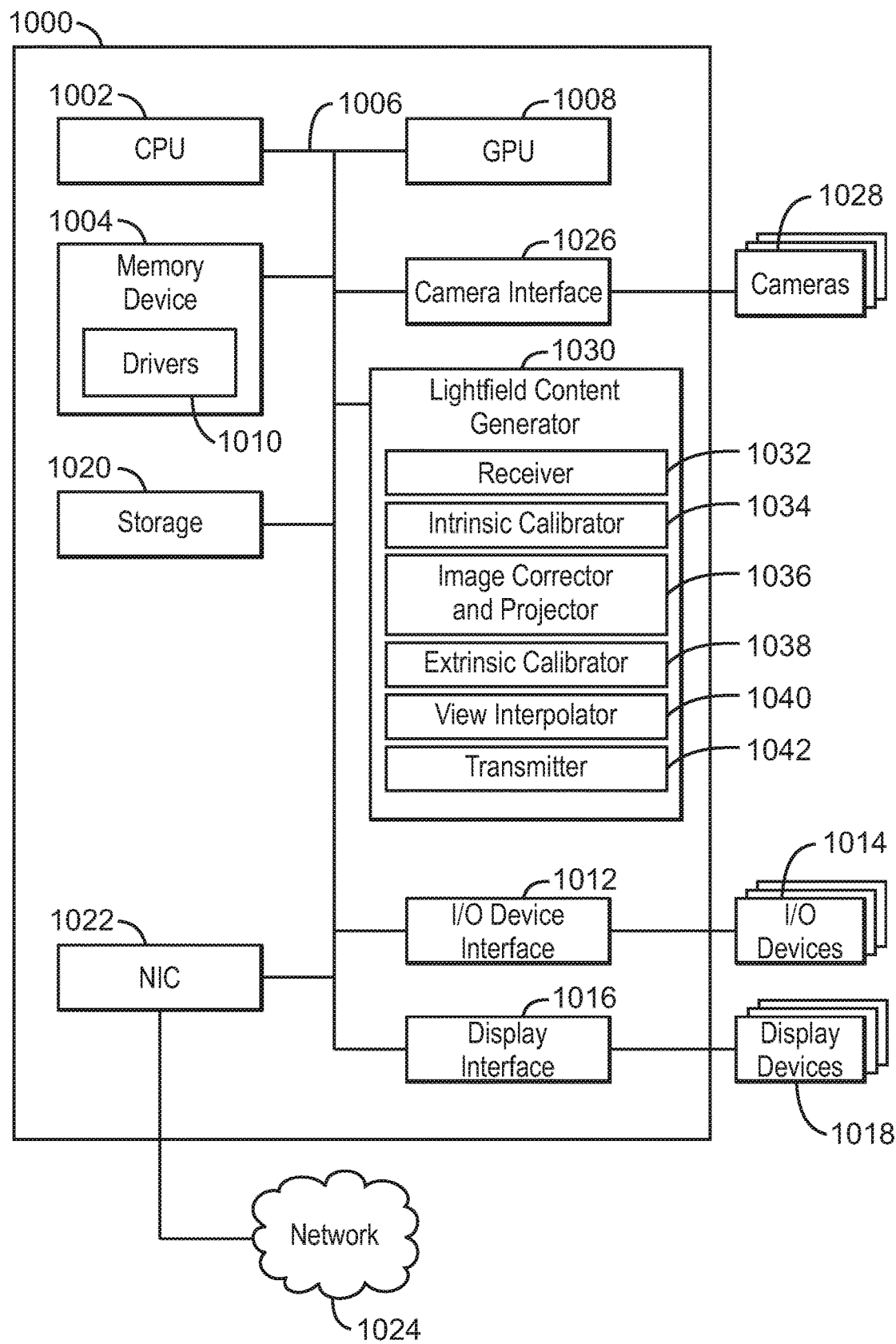
FIG. 10, a block diagram is shown illustrating an example computing device that can generate virtual reality content via light fields.

Referring now to FIG. 10, a block diagram is shown illustrating an example computing device that can generate virtual reality content via light fields. The computing device 1000 may be, for example, a laptop computer, desktop computer, tablet computer, mobile device, or wearable device, among others. In some examples, the computing device 1000 may be a smart camera or a digital security surveillance camera. The computing device 1000 may include a central processing unit (CPU) 1002 that is configured to execute stored instructions, as well as a memory device 1004 that stores instructions that are executable by the CPU 1002. The CPU 1002 may be coupled to the memory device 1004 by a bus 1006. Additionally, the CPU 1002 can be a single core processor, a multi-core processor, a computing cluster, or any number of other configurations. Furthermore, the computing device 1000 may include more than one CPU 1002. In some examples, the CPU 1002 may be a system-on-chip (SoC) with a multi-core processor architecture. In some examples, the CPU 1002 can be a specialized digital signal processor (DSP) used for image processing. The memory device 1004 can include random access memory (RAM), read only memory (ROM), flash memory, or any other suitable memory systems. For example, the memory device 1004 may include dynamic random-access memory (DRAM).

The memory device 1004 can include random access memory (RAM), read only memory (ROM), flash memory, or any other suitable memory systems. For example, the memory device 1004 may include dynamic random-access memory (DRAM). The memory device 1004 may include device drivers 1010 that are configured to execute the instructions for generating virtual reality content via light fields. The device drivers 1010 may be software, an application program, application code, or the like.

The computing device 1000 may also include a graphics processing unit (GPU) 1008. As shown, the CPU 1002 may be coupled through the bus 1006 to the GPU 1008. The GPU 1008 may be configured to perform any number of graphics operations within the computing device 1000. For example, the GPU 1008 may be configured to render or manipulate graphics images, graphics frames, videos, or the like, to be displayed to a viewer of the computing device 1000.

The memory device 1004 can include random access memory (RAM), read only memory (ROM), flash memory, or any other suitable memory systems. For example, the memory device 1004 may include dynamic random-access memory (DRAM). The memory device 1004 may include device drivers 1010 that are configured to execute the instructions for generating virtual input devices. The device drivers 1010 may be software, an application program, application code, or the like.

The CPU 1002 may also be connected through the bus 1006 to an input/output (I/O) device interface 1012 configured to connect the computing device 1000 to one or more I/O devices 1014. The I/O devices 1014 may include, for example, a keyboard and a pointing device, wherein the pointing device may include a touchpad or a touchscreen, among others. The I/O devices 1014 may be built-in components of the computing device 1000, or may be devices that are externally connected to the computing device 1000. In some examples, the memory 1004 may be communicatively coupled to I/O devices 1014 through direct memory access (DMA).

The CPU 1002 may also be linked through the bus 1006 to a display interface 1016 configured to connect the computing device 1000 to a display device 1018. The display devices 1018 may include a display screen that is a built-in component of the computing device 1000. The display devices 1018 may also include a computer monitor, television, or projector, among others, that is internal to or externally connected to the computing device 1000. The display device 1018 may also include a head mounted display. For example, the head mounted display may receive a stereoscopic light field view corresponding to a particular perspective. For example, the head mounted display can detect a translation and send updated coordinates corresponding to the perspective to the receiver 1032 described below.

The computing device 1000 also includes a storage device 1020. The storage device 1020 is a physical memory such as a hard drive, an optical drive, a thumbdrive, an array of drives, a solid-state drive, or any combinations thereof. The storage device 1020 may also include remote storage drives.

The computing device 1000 may also include a network interface controller (NIC) 1022. The NIC 1022 may be configured to connect the computing device 1000 through the bus 1006 to a network 1024. The network 1024 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1000 further includes a camera interface 1026. For example, the camera interface 1026 may be connected to a plurality of cameras 1028. In some examples, the plurality of cameras may be arranged in a camera ring. Additionally, in some cases, the cameras may be arranged in a plurality of rings. In some examples, the cameras 1028 may include wide-angle lenses. For example, the wide-angle lenses may be designed based on a typical field of view of a viewer or a field of view of an HMD. In some examples, cameras 1028 may be used to capture multiple views of a scene.

The computing device 1000 further includes a light field content generator 1030. For example, the light field content generator 1030 can be used to generate stereoscopic light field views to be viewed in a head mounted display. The light field content generator 1030 can include a receiver 1032, an intrinsic calibrator 1034, an image corrector and projector 1036, an extrinsic calibrator 1038, a view interpolator 1040, and a transmitter 1042. In some examples, each of the components 1032-1042 of the light field content generator 1030 may be a microcontroller, embedded processor, or software module. The receiver 1032 can receive a plurality of images. In some examples, the plurality of images is captured using a plurality of wide-angle lenses and synchronized using audio. The intrinsic calibrator 1034 can calibrate the plurality of cameras use to capture the plurality of images. The intrinsic parameters may be different for each camera. The image corrector and projector can obtain calibrated camera intrinsic parameters from the intrinsic calibrator 1034 and apply fisheye correction and spherical projection to all fisheye images. The correction will undistort the fisheye image, and the spherical projection will project the undistorted image onto a sphere. The image projected onto the sphere may then be re-projected from the unit sphere to an equirectangular image plane. The extrinsic calibrator may be used to estimate camera extrinsic parameters. Extrinsic parameters are parameters used to describe the transformation between the camera and its external world. A stereo calibration may then be performed between the reference cameras to complete a full camera circle extrinsic calibration. The images may also be rectified and aligned so that pixels between each image pair are aligned along the same horizontal line.

A view interpolator 1040 is used to interpolate dense views in between two neighboring views to support a smooth circular head movement. View interpolation may be performed in several ways. The view interpolator 1040 can perform intermediate view interpolation on the undistorted rectilinear images based on the optical flow. For example, the interpolation can be based on a smoothness factor. The smoothness factor may indicate the density of the interpolation to be applied. In some examples, the smoothness factor may be based on a detected speed of translation of the head mounted display. For example, a higher speed of translation may result in a lower smoothness factor. A lower speed may result in a higher smoothness factor. A transmitter 1042 may then transmit particular views corresponding to perspective/particular head position of the viewer as requested from a display application of a head mounted display.

The block diagram of FIG. 10 is not intended to indicate that the computing device 1000 is to include all of the components shown in FIG. 10. Rather, the computing device 1000 can include fewer or additional components not illustrated in FIG. 10, such as additional buffers, additional processors, and the like. The computing device 1000 may include any number of additional components not shown in FIG. 10, depending on the details of the specific implementation. Furthermore, any of the functionalities of the receiver 1032, the intrinsic calibrator 1034, the image corrector and projector 1036, the extrinsic calibrator 1038, the view interpolator 1040, and the transmitter 1042, may be partially, or entirely, implemented in hardware and/or in the processor 1002. For example, the functionality may be implemented with an application specific integrated circuit, in logic implemented in the processor 1002, or in any other device. For example, the functionality of the light field content generator 1030 may be implemented with an application specific integrated circuit, in logic implemented in a processor, in logic implemented in a specialized graphics processing unit such as the GPU 1008, or in any other device.

Figure 11:
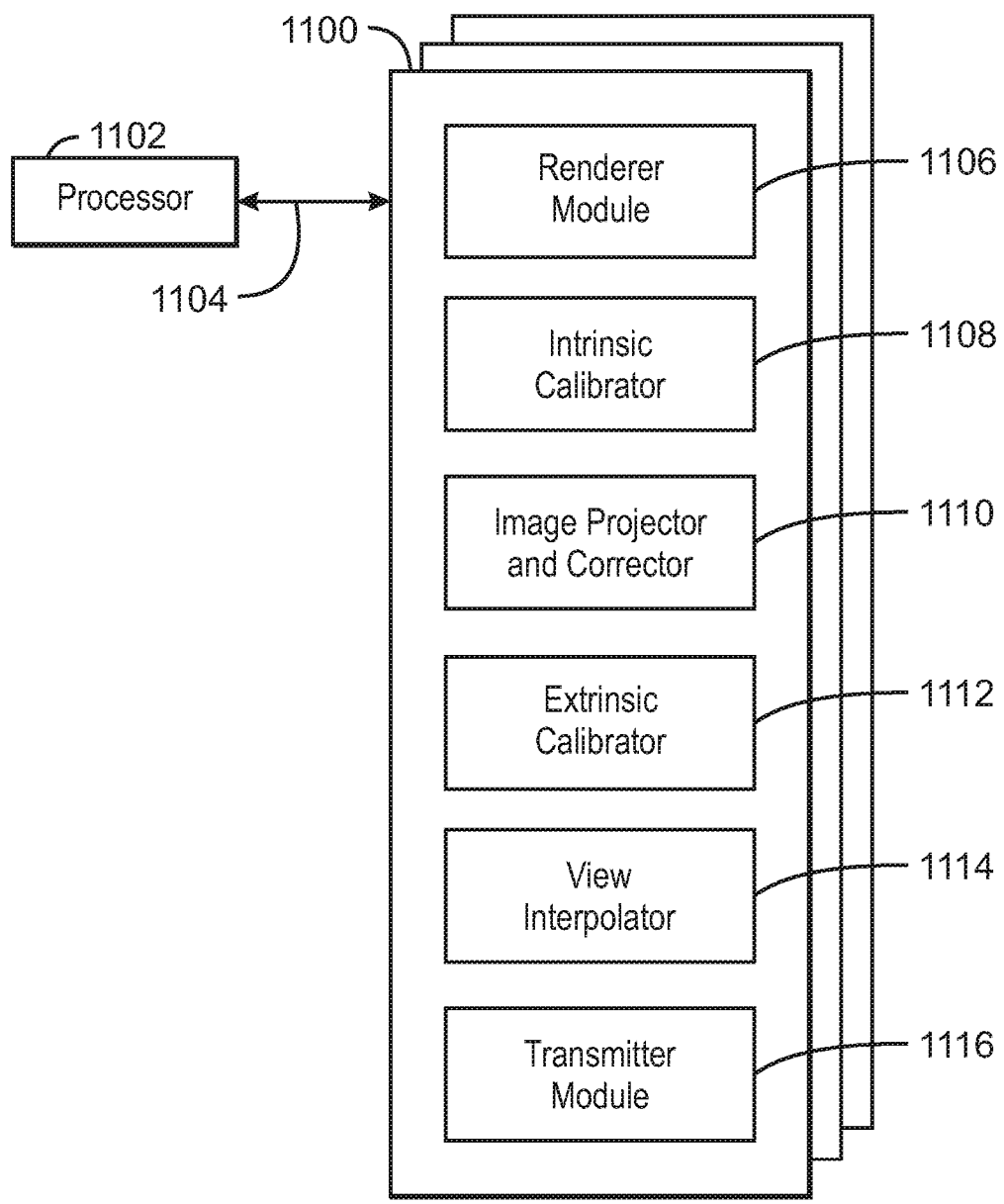
FIG. 11 is a block diagram showing computer readable media that store code for generating s virtual reality content via light fields.

FIG. 11 is a block diagram showing computer readable media 1100 that store code for generating s virtual reality content via light fields. The computer readable media 1100 may be accessed by a processor 1102 over a computer bus 1104. Furthermore, the computer readable medium 1100 may include code configured to direct the processor 1102 to perform the methods described herein. In some embodiments, the computer readable media 1100 may be non-transitory computer readable media. In some examples, the computer readable media 1100 may be storage media.

The various software components discussed herein may be stored on one or more computer readable media 1100, as indicated in FIG. 11. For example, a receiver module 1106 may be configured to receive a plurality of images. For example, the images may be obtained from a plurality of cameras. An intrinsic module 1108 can calibrate the plurality of cameras use to capture the plurality of images. The intrinsic parameters may be different for each camera. The image corrector and projector module 1110 can obtain calibrated camera intrinsic parameters from the intrinsic calibrator module 1108 and apply fisheye correction and spherical projection to all fisheye images. The correction will undistort the fisheye image, and the spherical projection will project the undistorted image onto a sphere. The image projected onto the sphere may then be re-projected from the unit sphere to an equirectangular image plane. The extrinsic calibrator module 1112 may be used to estimate camera extrinsic parameters. Extrinsic parameters are parameters used to describe the transformation between the camera and its external world. A stereo calibration may then be performed between the reference cameras to complete a full camera circle extrinsic calibration. The images may also be rectified and aligned so that pixels between each image pair are aligned along the same horizontal line. A view interpolation module 1114 is to interpolate dense views in between two neighboring views to support a smooth circular head movement. A transmitter module 1116 may be configured to receive coordinates corresponding to a perspective from a head mounted display. For example, the coordinates may indicate a translation of the head mounted display. The transmitter module 1116 may be configured to transmit a stereoscopic light field view of the perspective corresponding to the coordinates to the head mounted display. In some examples, the transmitter module 1116 may also be configured to transmit an updated stereoscopic light field view corresponding to a different perspective to the head mounted display in response to receiving an updated coordinate corresponding to the different perspective.

The block diagram of FIG. 11 is not intended to indicate that the computer readable media 1100 is to include all of the components shown in FIG. 11. Further, the computer readable media 1100 may include any number of additional components not shown in FIG. 11, depending on the details of the specific implementation.

Example 1 is a method for generating light field content. The method includes receiving a plurality of images from the plurality of wide-angle cameras; correcting the plurality of images; interpolating intermediate views from the corrected plurality of images; and transmitting at least one of an image of the plurality of images and an intermediate view for rendering based on a requested perspective.

Example 2 includes the method of example 1, including or excluding optional features. In this example, the plurality of wide-angle cameras is arranged in at least one camera ring.

Example 3 includes the method of any one of examples 1 to 2, including or excluding optional features. In this example, the plurality of wide-angle cameras is arranged in a plurality of camera rings along a virtual sphere.

Example 4 includes the method of any one of examples 1 to 3, including or excluding optional features. In this example, the intermediate views are interpolated by calculating a disparity between neighboring views of undistorted images derived from the plurality of images to determine an optical flow between the neighboring views of undistorted images.

Example 5 includes the method of any one of examples 1 to 4, including or excluding optional features. In this example, the method includes rectifying and aligning the corrected plurality of images, and interpolating the intermediate views from the rectified and aligned images.

Example 6 includes the method of any one of examples 1 to 5, including or excluding optional features. In this example, correcting the plurality of images comprises undistorting the plurality of images.

Example 7 includes the method of any one of examples 1 to 6, including or excluding optional features. In this example, correcting the plurality of images comprises generating rectilinear images from the plurality of images.

Example 8 includes the method of any one of examples 1 to 7, including or excluding optional features. In this example, a size of the image and a size of the intermediate view is sufficiently large to render entirely in a field of view of a display.

Example 9 includes the method of any one of examples 1 to 8, including or excluding optional features. In this example, a size of the image and a size of the intermediate view is sufficiently large to render entirely in a human visual field.

Example 10 includes the method of any one of examples 1 to 9, including or excluding optional features. In this example, the intermediate views are interpolated in real-time.

Example 11 is a system for generating light field content. The system includes a plurality of wide-angle cameras arranged to capture a scene; a memory to store instructions and that is communicatively coupled to the plurality of camera; and a processor communicatively coupled to the plurality of cameras and the memory, wherein when the processor is to execute the instructions, the processor is to: receive a plurality of images from the plurality of wide-angle cameras; correct the plurality of images; interpolate intermediate views from the corrected plurality of images; and transmit at least one of an image of the plurality of images and an intermediate view for rendering based on a requested perspective.

Example 12 includes the system of example 11, including or excluding optional features. In this example, the plurality of wide-angle cameras is arranged in at least one camera ring.

Example 13 includes the system of any one of examples 11 to 12, including or excluding optional features. In this example, the plurality of wide-angle cameras is arranged in a plurality of camera rings along a virtual sphere.

Example 14 includes the system of any one of examples 11 to 13, including or excluding optional features. In this example, the intermediate views are interpolated by calculating a disparity between neighboring views of undistorted images derived from the plurality of images to determine an optical flow between the neighboring views of undistorted images.

Example 15 includes the system of any one of examples 11 to 14, including or excluding optional features. In this example, the system includes rectifying and aligning the corrected plurality of images, and interpolating the intermediate views from the rectified and aligned images.

Example 16 includes the system of any one of examples 11 to 15, including or excluding optional features. In this example, correcting the plurality of images comprises undistorting the plurality of images.

Example 17 includes the system of any one of examples 11 to 16, including or excluding optional features. In this example, correcting the plurality of images comprises generating rectilinear images from the plurality of images.

Example 18 includes the system of any one of examples 11 to 17, including or excluding optional features. In this example, a size of the image and a size of the intermediate view is sufficiently large to render entirely in a field of view of a display.

Example 19 includes the system of any one of examples 11 to 18, including or excluding optional features. In this example, a size of the image and a size of the intermediate view is sufficiently large to render entirely in a human visual field.

Example 20 includes the system of any one of examples 11 to 19, including or excluding optional features. In this example, the intermediate views are interpolated in real-time.

Example 21 is an apparatus. The apparatus includes a receiver to receive a plurality of images from a camera array, wherein the camera array comprises wide-angle cameras; a calibrator to intrinsically calibrate the wide-angle cameras; a corrector and projector to undistort images from the wide-angle cameras and project the undistorted images to generate undistorted rectilinear images; an extrinsic calibrator to rectify and align the undistorted rectilinear images; and a view interpolator to interpolate intermediate views from the rectified and aligned undistorted rectilinear images.

Example 22 includes the apparatus of example 21, including or excluding optional features. In this example, the wide-angle cameras are arranged in at least one camera ring.

Example 23 includes the apparatus of any one of examples 21 to 22, including or excluding optional features. In this example, the wide-angle cameras are arranged in a plurality of camera rings along a virtual sphere.

Example 24 includes the apparatus of any one of examples 21 to 23, including or excluding optional features. In this example, the intermediate views are interpolated by calculating a disparity between neighboring images of the undistorted rectilinear images to determine an optical flow between the undistorted rectilinear images.

Example 25 includes the apparatus of any one of examples 21 to 24, including or excluding optional features. In this example, rectifying and aligning the undistorted rectilinear images comprises projecting two-or-more images onto a common image plane to align pixels between an image pair along a same horizontal line.

Example 26 includes the apparatus of any one of examples 21 to 25, including or excluding optional features. In this example, undistorting the images comprises projecting the images from a fisheye image plane to an equirectangular image plane.

Example 27 includes the apparatus of any one of examples 21 to 26, including or excluding optional features. In this example, the apparatus includes transmitting at least one of an undistorted rectilinear image or an intermediate view to be rendered in response to coordinates indicating a new perspective from a head mounted display.

Example 28 includes the apparatus of any one of examples 21 to 27, including or excluding optional features. In this example, a size of an image or an intermediate view is sufficiently large to render entirely in a field of view of a display.

Example 29 includes the apparatus of any one of examples 21 to 28, including or excluding optional features. In this example, a size of an image or an intermediate view is sufficiently large to render entirely in a human visual field.

Example 30 includes the apparatus of any one of examples 21 to 29, including or excluding optional features. In this example, the intermediate views are interpolated in real-time.

Example 31 is a tangible, non-transitory, computer-readable medium. The computer-readable medium includes instructions that direct the processor to receive a plurality of images from the plurality of wide-angle cameras; correct the plurality of images; interpolate intermediate views from the corrected plurality of images; and transmit at least one of an image of the plurality of images and an intermediate view for rendering based on a requested perspective.

Example 32 includes the computer-readable medium of example 31, including or excluding optional features. In this example, the plurality of wide-angle cameras is arranged in at least one camera ring.

Example 33 includes the computer-readable medium of any one of examples 31 to 32, including or excluding optional features. In this example, the plurality of wide-angle cameras is arranged in a plurality of camera rings along a virtual sphere.

Example 34 includes the computer-readable medium of any one of examples 31 to 33, including or excluding optional features. In this example, the intermediate views are interpolated by calculating a disparity between neighboring views of undistorted images derived from the plurality of images to determine an optical flow between the neighboring views of undistorted images.

Example 35 includes the computer-readable medium of any one of examples 31 to 34, including or excluding optional features. In this example, the computer-readable medium includes rectifying and aligning the corrected plurality of images, and interpolating the intermediate views from the rectified and aligned images.

Example 36 includes the computer-readable medium of any one of examples 31 to 35, including or excluding optional features. In this example, correcting the plurality of images comprises undistorting the plurality of images.

Example 37 includes the computer-readable medium of any one of examples 31 to 36, including or excluding optional features. In this example, correcting the plurality of images comprises generating rectilinear images from the plurality of images.

Example 38 includes the computer-readable medium of any one of examples 31 to 37, including or excluding optional features. In this example, a size of the image and a size of the intermediate view is sufficiently large to render entirely in a field of view of a display.

Example 39 includes the computer-readable medium of any one of examples 31 to 38, including or excluding optional features. In this example, a size of the image and a size of the intermediate view is sufficiently large to render entirely in a human visual field.

Example 40 includes the computer-readable medium of any one of examples 31 to 39, including or excluding optional features. In this example, the intermediate views are interpolated in real-time.

Example 41 is an apparatus. The apparatus includes instructions that direct the processor to a means to receive a plurality of images from a camera array, wherein the camera array comprises wide-angle cameras; a means to intrinsically calibrate the wide-angle cameras; a means to undistort images from the wide-angle cameras and project the undistorted images to generate undistorted rectilinear images; a means to rectify and align the undistorted rectilinear images; and a means to interpolate intermediate views from the rectified and aligned undistorted rectilinear images.

Example 42 includes the apparatus of example 41, including or excluding optional features. In this example, the wide-angle cameras are arranged in at least one camera ring.

Example 43 includes the apparatus of any one of examples 41 to 42, including or excluding optional features. In this example, the wide-angle cameras are arranged in a plurality of camera rings along a virtual sphere.

Example 44 includes the apparatus of any one of examples 41 to 43, including or excluding optional features. In this example, the intermediate views are interpolated by calculating a disparity between neighboring images of the undistorted rectilinear images to determine an optical flow between the undistorted rectilinear images.

Example 45 includes the apparatus of any one of examples 41 to 44, including or excluding optional features. In this example, rectifying and aligning the undistorted rectilinear images comprises projecting two-or-more images onto a common image plane to align pixels between an image pair along a same horizontal line.

Example 46 includes the apparatus of any one of examples 41 to 45, including or excluding optional features. In this example, undistorting the images comprises projecting the images from a fisheye image plane to an equirectangular image plane.

Example 47 includes the apparatus of any one of examples 41 to 46, including or excluding optional features. In this example, the apparatus includes transmitting at least one of an undistorted rectilinear image or an intermediate view to be rendered in response to coordinates indicating a new perspective from a head mounted display.

Example 48 includes the apparatus of any one of examples 41 to 47, including or excluding optional features. In this example, a size of an image or an intermediate view is sufficiently large to render entirely in a field of view of a display.

Example 49 includes the apparatus of any one of examples 41 to 48, including or excluding optional features. In this example, a size of an image or an intermediate view is sufficiently large to render entirely in a human visual field.

Example 50 includes the apparatus of any one of examples 41 to 49, including or excluding optional features. In this example, the intermediate views are interpolated in real-time.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for generating virtual reality content, the method comprising:
    capturing a plurality of images with a plurality of wide-angle cameras disposed in a circular array, the wide-angle cameras to capture corresponding to images of the plurality of images, each of the plurality of images to fully cover a field of view of a head-mounted display, the field of view of the head-mounted display larger than a field of view of a wearer of the head-mounted display;
    correcting the plurality of images to compensate for a fish-eye effect to determine a plurality of corrected images;
    interpolating, in real-time and in response to movement information generated at the head-mounted display, between a first corrected image of the plurality of corrected images and second corrected image of the plurality of corrected images to form at least one intermediate image, the movement information identifying a first position of the head-mounted display and a second position of the head-mounted display, the first corrected image associated with the first position of the head-mounted display, and the second corrected image associated with the second position of the head-mounted display, and the at least one intermediate image formed without stitching; and
    transmitting the first corrected image, the second corrected image, and the at least one intermediate image for rendering as the virtual reality content on the head-mounted display in real-time.

2. The method of claim 1, wherein the plurality of wide-angle cameras disposed in the circular array includes at least one ring of cameras.

3. The method of claim 1, wherein the plurality of wide-angle cameras disposed in the circular array includes a plurality of camera rings along a virtual sphere.

4. The method of claim 1, wherein the interpolating includes calculating a disparity between neighboring views of ones of the corrected images to determine an optical flow between the neighboring views of the ones of the corrected images.

5. The method of claim 1, further including rectifying and aligning the plurality of corrected images, and the interpolating of the at least one intermediate image is based on the rectified and aligned first corrected image and second corrected image.

6. The method of claim 1, wherein the correcting of the plurality of images includes generating rectilinear images from the plurality of images.

7. A system for generating light field content, the system comprising:
    memory to store instructions; and
    a processor to execute the instructions, the instructions, when executed, to cause the processor to:
    correct a plurality of input images to compensate for a fish-eye effect to determine a plurality of corrected images, the plurality of input images captured with a plurality of wide-angle cameras arranged to form a circular array, each of the plurality of input images to fully cover a field of view of a head-mounted display, the field of view of the head-mounted display larger than a field of view of a wearer of the head-mounted display;
    interpolate, in real time and in response to movement data from the head-mounted display, between a first one of the corrected images and a second one of the corrected images to form at least one intermediate image, the first one of the corrected images associated with a first position of the head-mounted display, the second one of the corrected images associated with a second position of the head-mounted display, the first and second positions of the head-mounted display included in the movement data, and the at least one intermediate image formed without stitching; and
    cause the first one of the corrected images, the second one of the corrected images and the at least one intermediate image to be transmitted to the head-mounted display for rendering as light field content.

8. The system of claim 7, wherein the circular array includes at least one ring of at least some of the plurality of wide-angle cameras.

9. The system of claim 7, wherein the circular array of the plurality of wide-angle cameras is arranged to form a virtual sphere.

10. The system of claim 7, wherein the processor is to form the at least one intermediate image by calculating a disparity between the first one of the corrected images and the second one of the corrected images, and the first one of the corrected images and the second one of the corrected images are neighboring views.

11. The system of claim 7, wherein the instructions, when executed, cause the processor to rectify and align the plurality of corrected images prior to interpolation between the first one of the corrected images and the second one of the corrected images.

12. The system of claim 7, wherein the processor is to correct the plurality of input images by undistorting the plurality of input images.

13. The system of claim 7, wherein the processor is to generate rectilinear images based on the plurality of input images.

14. An apparatus comprising:
    a receiver to receive a plurality of images from a camera array, the camera array to include a plurality of wide-angle cameras;

a calibrator to intrinsically calibrate the plurality of wide-angle cameras;

an image corrector and projector to generate undistorted rectilinear images by applying fisheye correction and spherical projection to the plurality of images captured with the plurality of wide-angle cameras, each of the plurality of images to fully cover a field of view of a head-mounted display, and the field of view of the head-mounted display larger than a field of view of a wearer of the head-mounted display;

an extrinsic calibrator to rectify and align the undistorted rectilinear images; and a view interpolator to, in real-time and in response to movement information received from the head-mounted display, interpolate intermediate views between ones of the rectified and aligned undistorted rectilinear images, the ones of the rectified and aligned undistorted rectilinear images corresponding to the movement information, and the intermediate views formed without stitching.

15. The apparatus of claim 14, wherein the camera array includes at least one camera ring.

16. The apparatus of claim 14, wherein the camera array of the plurality of wide-angle cameras includes a plurality of camera rings disposed to form a virtual sphere.

17. The apparatus of claim 14, wherein the view interpolator is to interpolate the intermediate views by calculating a disparity between neighboring ones of the undistorted rectilinear images to determine an optical flow between the undistorted rectilinear images.

* * * * *